United States Patent
Ueda et al.

(10) Patent No.: US 10,392,675 B2
(45) Date of Patent: Aug. 27, 2019

(54) SEAMLESS STEEL PIPE AND METHOD FOR PRODUCING THE SAME

(71) Applicant: NIPPON STEEL & SUMITOMO METAL CORPORATION, Tokyo (JP)

(72) Inventors: Yukimasa Ueda, Tokyo (JP); Yuji Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 297 days.

(21) Appl. No.: 14/396,837

(22) PCT Filed: Apr. 10, 2013

(86) PCT No.: PCT/JP2013/060828
§ 371 (c)(1),
(2) Date: Oct. 24, 2014

(87) PCT Pub. No.: WO2013/161567
PCT Pub. Date: Oct. 31, 2013

(65) Prior Publication Data
US 2015/0083282 A1 Mar. 26, 2015

(30) Foreign Application Priority Data

Apr. 27, 2012 (JP) .................................. 2012-103838

(51) Int. Cl.
*C21D 8/10* (2006.01)
*C21D 9/08* (2006.01)
(Continued)

(52) U.S. Cl.
CPC .............. *C21D 8/105* (2013.01); *C21D 8/10* (2013.01); *C21D 9/08* (2013.01); *C22C 38/00* (2013.01);
(Continued)

(58) Field of Classification Search
CPC . C21D 7/13; C21D 8/10; C21D 8/105; C21D 9/08; C21D 9/085; C21D 2211/001;
(Continued)

(56) References Cited

U.S. PATENT DOCUMENTS

| 2008/0047635 | A1* | 2/2008 | Kondo | ..................... C22C 38/00 148/541 |
| 2013/0000790 | A1* | 1/2013 | Arai | ....................... C21D 8/105 148/506 |

FOREIGN PATENT DOCUMENTS

| CA | 2 602 526 | 10/2006 |
| CN | 1840726 | 10/2006 |

(Continued)

*Primary Examiner* — Jie Yang
(74) *Attorney, Agent, or Firm* — Clark & Brody

(57) ABSTRACT

There is provided a seamless steel pipe having high strength and high toughness even if having a thick wall. A seamless steel pipe according to the present embodiment consists of: in mass %, C: 0.03 to 0.08%, Si: not more than 0.25%, Mn: 0.3 to 2.0%, P: not more than 0.05%, S: not more than 0.005%, Al: 0.001 to 0.10%, Cr: 0.02 to 1.0%, Ni: 0.02 to 1.0%, Mo: 0.02 to 0.8%, N: 0.002 to 0.008%, Ca: 0.0005 to 0.005%, and Nb: 0.01 to 0.1%, the balance being Fe and impurities, and has a wall thickness of not less than 50 mm. In a cross section perpendicular to an axial direction of the seamless steel pipe, an average crystal grain size of prior austenite grains in a near surface portion is less than 80 µm, the near surface portion being a 500 µm×500 µm area centered at a position of a depth of 2 mm from a surface, and a difference between the average crystal grain size of the prior austenite grains in the near surface portion and an average crystal grain size of prior austenite grains in a central portion of a wall thickness of the cross section is less than 50 µm, the central portion being a 500 µm×500 µm area centered at a center position of the wall thickness.

4 Claims, 3 Drawing Sheets

(51) Int. Cl.
| | |
|---|---|
| *C22C 38/00* | (2006.01) |
| *C22C 38/58* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *F16L 9/02* | (2006.01) |
| *C21D 7/13* | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/02* (2013.01); *C21D 7/13* (2013.01); *C21D 9/085* (2013.01); *C21D 2211/001* (2013.01); *C21D 2211/004* (2013.01)

(58) Field of Classification Search
CPC ...... C21D 2211/004; F16L 9/02; C22C 38/00; C22C 38/001; C22C 38/002; C22C 38/04; C22C 38/06; C22C 38/42; C22C 38/44; C22C 38/46; C22C 38/48; C22C 38/50; C22C 38/58
USPC ......................................................... 148/593
See application file for complete search history.

(56) References Cited

FOREIGN PATENT DOCUMENTS

| | | |
|---|---|---|
| JP | 09-287028 | 11/1997 |
| JP | 2010-196165 | 9/2010 |
| WO | 2011/152240 | 12/2011 |

\* cited by examiner

SEAMLESS STEEL PIPE AND METHOD FOR PRODUCING THE SAME

TECHNICAL FIELD

The present invention relates to a seamless steel pipe and a method for producing the same.

BACKGROUND ART

Oil wells and gas wells on the land and in the shallow sea are drying up in recent years. For that reason, undersea oil wells and undersea gas wells (hereinafter, undersea oil well and undersea gas well are collectively referred to as "undersea oil well") of a deep sea have been developed.

In the undersea oil well, a flow line and a riser are arranged from a well mouth arranged on the seafloor to an off-shore platform. A production fluid containing crude oil or natural gas is carried from the undersea oil well to the platform through the flow line or the riser. The flow line means a line pipe laid along the geographical features of the surface of the earth or the undersea surface. The riser means a line pipe arranged in such a way as to rise up in the direction of the platform (in other words, in the upward direction) from the undersea surface.

The production fluid flowing in a steel pipe constructing these line pipes (flow line and riser) has a high pressure. Further, in the case where an operation is stopped, a sea water pressure is applied to the flow line and the riser from the outside. Still further, a repeated stress is also applied to the flow line and the riser by the wave and the sea current. For that reason, a high strength steel pipe having a thick wall has been required for the line pipe such as the flow line and the riser.

However, when a steel pipe has its wall thickness and strength increased, the steel pipe has its toughness reduced and hence easily causes brittle fracture. For that reason, the high strength steel pipe having a thick wall is required to have excellent toughness.

In this way, a steel pipe having a thick wall for an undersea pipeline is required to have high strength and high toughness. A welded steel pipe has a welded portion (seam portion) along a lengthwise direction and hence the welded portion is lower in toughness than a base material. For that reason, a seamless steel pipe is more suitable for the undersea pipeline than the welded steel pipe.

JP9-287028A (Patent Literature 1) proposes a method for producing a seamless steel pipe. In Patent Literature 1, a seamless steel pipe produced by hot rolling is cooled to a temperature not more than an $A_{r3}$ transformation point at a cooling rate not less than 80° C./min and then is quenched and tempered. It is described that the seamless steel pipe produced by the producing method of Patent Literature 1 has crystal grains fined and hence has high strength and high toughness.

DISCLOSURE OF THE INVENTION

However, in the case where, for example, a thick-walled seamless steel pipe having a wall thickness as large as not less than 50 mm is produced by the producing method disclosed in Patent Literature 1, the seamless steel pipe might be varied and reduced in toughness. In order to increase strength, Nb is effective, but in the case where a seamless steel pipe contains Nb, the seamless steel pipe might be further reduced in toughness in a near surface portion and the scatter of toughness between a near surface portion and a central portion of a wall thickness might become large.

An objective of the present invention is to provide a seamless steel pipe having high strength and high toughness even if having a thick wall.

A seamless steel pipe according to the present embodiment consists of: in mass %, C: 0.03 to 0.08%, Si: not more than 0.25%, Mn: 0.3 to 2.0%, P: not more than 0.05%, S: not more than 0.005%, Al: 0.001 to 0.10%, Cr: 0.02 to 1.0%, Ni: 0.02 to 1.0%, Mo: 0.02 to 0.8%, N: 0.002 to 0.008%, Ca: 0.0005 to 0.005%, and Nb: 0.01 to 0.1%, the balance being Fe and impurities, and has a wall thickness not less than 50 mm. Further, in a cross section perpendicular to an axial direction of the seamless steel pipe, an average crystal grain size of prior austenite grains in a near surface portion is less than 80 µm, the near surface portion being a 500 µm×500 µm area centered at a position of a depth of 2 mm from a surface, and a difference between the average crystal grain size of the prior austenite grains in the near surface portion and an average crystal grain size in a center portion of a wall thickness in the section is less than 50 µm, the center portion being a 500 µm×500 µm area centered at a center position of the wall thickness of the seamless steel pipe.

Further, a seamless steel pipe according to the present embodiment may contain Ti: not more than 0.010%, in place of a part of Fe. Still further, a seamless steel pipe according to the present embodiment may contain at least one selected from a group consisting of: V: not more than 0.1%, and Cu: not more than 1.0%, in place of a part of Fe.

A method for producing a seamless steel pipe according to the present embodiment includes: a step of heating a starting material consisting of: in mass %, C: 0.03 to 0.08%, Si: not more than 0.25%, Mn: 0.3 to 2.0%, P: not more than 0.05%, S: not more than 0.005%, Al: 0.001 to 0.10%, Cr: 0.02 to 1.0%, Ni: 0.02 to 1.0%, Mo: 0.02 to 0.8%, N: 0.002 to 0.008%, Ca: 0.0005 to 0.005%, and Nb: 0.01 to 0.1%, the balance being Fe and impurities; a step of hot working the heated starting material to thereby produce a material pipe; a step of cooling the hot worked material pipe in an accelerated manner; a step of reheating the material pipe cooled in the accelerated manner and then of soaking the material pipe at 990 to 1100° C.; a step of quickly cooling the soaked material pipe to thereby quench the material pipe; and a step of tempering the quenched material pipe.

The seamless steel pipe according to the present embodiment has excellent strength and excellent toughness even if it has a thick wall.

BEST MODE FOR CARRYING OUT THE INVENTION

Figure 1:
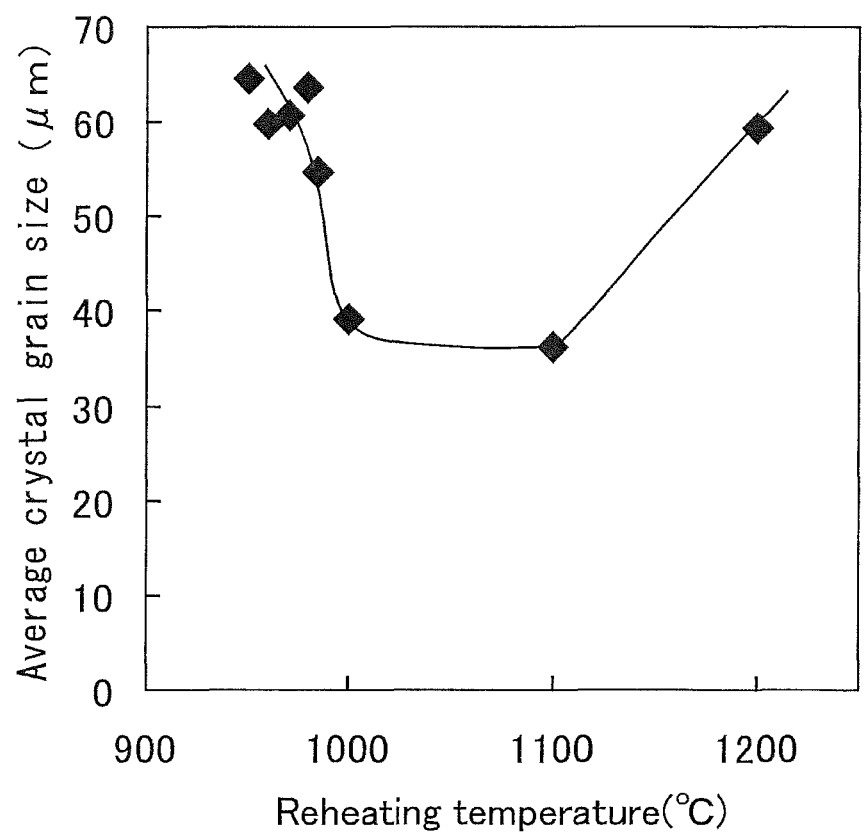
FIG. 1 is a graph showing a relationship between an average crystal grain size and a reheating temperature when steel having a chemical composition of the present embodiment is heated to various temperatures at 5° C./min after the steel is quenched.

Hereinafter, an embodiment of the present invention will be described in detail with reference to the drawings. Same parts or equivalent parts in the drawings will be denoted by the same reference symbols and their descriptions will be not repeatedly made. Hereinafter, a percent (%) relating to an element means "a mass %".

The present inventors have completed a seamless steel pipe according to the present embodiment on the basis of the following findings.

In a seamless steel pipe having a thick wall not less than 50 mm, Nb combines with carbon to form NbC, thereby increasing the strength of the steel. Hence, in order to produce a seamless steel pipe having a thick wall and having high strength, especially, a strength of not less than X 80 class (yield strength is not less than 551 MPa) specified in API (American Petroleum Institute) standards, the seamless steel pipe preferably contains Nb.

However, in the case where a seamless steel pipe having a thick wall and containing Nb is produced, there are cases where: a prior austenite grain (hereinafter referred to as "prior γ grain") after quenching and tempering might be not fined; and a prior γ grain in a near surface portion, in particular, might become a coarse grain. Here, the near surface portion means an area of a depth of 1 to 3 mm from the surface of the seamless steel pipe.

The reason why the prior γ grain becomes the coarse grain in the seamless steel pipe having a thick wall and containing Nb (hereinafter referred to as "Nb thick-walled pipe") is because NbC inhibits the growth of a granular reversely transformed γ grain when the γ grain is reheated. This point will be described in detail in the following.

When a hot-worked Nb thick-walled pipe is quenched and then reheated, the Nb thick-walled pipe which is being reheated has acicular reversely transformed γ grains and granular reversely transformed γ grains produced in the near surface portion thereof. Here, the reversely transformed γ means γ produced during heating. Then, the crystal orientations of the acicular reversely transformed γ grains and the crystal orientations of the granular reversely transformed γ grains were measured by an EBSD (Electron Back Scattering Diffraction) method. As a result, it was found that the crystal orientations of a plurality of acicular reversely transformed γ grains produced in the same prior γ grain were equal to each other. On the other hand, the crystal orientations of the granular reversely transformed γ grains were different from those of the acicular reversely transformed γ grains.

From this result, the followings are presumed. The plurality of acicular reversely transformed γ grains have the same crystal orientations and hence easily grow and bond to each other. In this case, coarse γ grains are formed. On the other hand, the granular reversely transformed γ grains have crystal orientations different from the acicular reversely transformed γ grains and hence are hard to bond to the acicular reversely transformed γ grains. For this reason, the more the granular reversely transformed γ grains are produced, the more the fine γ grains are formed.

NbC develops a pinning effect in the reheating process and inhibits the growth of the granular reversely transformed γ grains. For this reason, in the reheating process, the rate of the acicular reversely transformed γ grains increases. As a result, the prior γ grains easily become coarse grains in the near surface portion of the Nb thick-walled pipe after tempering.

When the prior γ grains become coarse grains, toughness becomes lower. Further, in the case of a thick-walled pipe, variations in the grain size of the prior γ grain are caused in a center portion of a wall thickness and in the near surface portion, which hence causes also variations in toughness.

Hence, in the Nb thick-walled pipe, by fining the grain sizes of the prior γ grains in the central portion of the wall thickness and in the near surface portion to thereby reduce the variations, the thick-walled pipe can have excellent strength and excellent toughness. Specifically, an average crystal grain size of the prior γ grains in the near surface portion is made less than 80 μm and a difference in the average crystal grain size of the prior γ grains between in the near surface portion and in the central portion of the wall thickness is made less than 50 μm, which hence can make the thick-walled pipe have excellent yield strength and excellent toughness and can prevent variations in the toughness in the near surface portion and in the central portion of the wall thickness.

In order to inhibit the prior γ grains in the near surface portion of the Nb thick-walled pipe from being coarsened, a heating temperature when the Nb thick-walled pipe is reheated is made 990° C. to 1100° C. FIG. 1 is a graph showing a relationship between an average crystal grain size and a reheating temperature when steel having a chemical composition of the present embodiment, which contains Nb, is heated to various temperatures after quenching. FIG. 1 was acquired by the following method.

A rectangular parallelepiped block was acquired from steel whose chemical composition is within the chemical composition described above by the same producing method as Example 1 which will be described later. A small cylindrical test specimen (diameter: 3 mm, height: 10 mm) for a heat treatment was acquired from the block. The test specimen was soaked at 1200° C. for 5 minutes and then was quickly cooled to a room temperature and subsequently was heated to a temperature between 950° C. and 1200° C. The test specimen was soaked at each temperature for 5 minutes and then was again quickly cooled to the room temperature. A heating rate was 5° C./min corresponding to a heating rate when the thick-walled steel pipe is heated in a heating furnace.

An average grain size (μm) of the prior γ grains after the heat treatment was obtained based on a method for measuring an average crystal grain size, which will be described later. FIG. 1 was acquired by the use of the obtained average crystal grain sizes.

Referring to FIG. 1, as a reheating temperature became higher from 950° C., the average crystal grain size became smaller. In a general technical common knowledge, when a heating temperature is increased, a crystal grain grows to become coarse. Hence, in the Nb thick-walled pipe was caused a phenomenon different from the conventional technical common knowledge. In the case where the reheating temperature was 990° C. to 1100° C., the average crystal grain size of the prior γ grains was held small, whereby the prior γ grains were fined. On the other hand, when the reheating temperature was higher than 1100° C., the prior γ grains were again coarsened.

The phenomenon shown in FIG. 1 is specific to the Nb thick-walled pipe and the following reason can be presumed. In the case where the reheating temperature is less than 990° C., NbC inhibits the growth of the granular reversely transformed γ grains in the reheating process. For this reason, the rate of the acicular reversely transformed γ grains is increased and hence the acicular reversely transformed γ grains bond to each other to thereby coarsen the prior γ grains after tempering.

On the other hand, in the case where the reheating temperature is 990 to 1100° C., NbC is dissolved in the reheating process. For that reason, the granular reversely transformed γ grains are produced and grown. As a result, the prior γ grains after tempering become fine. Further, a difference in the average crystal grain size of the prior γ grains between in the near surface portion and in the central portion of the wall thickness becomes small, which produces excellent toughness. Further, the dissolved NbC is again precipitated finely after tempering. For that reason, high strength can be also acquired.

When the reheating temperature is further increased and is higher than 1100° C., the fined γ grains are grown. As a result, the prior γ grains after tempering are coarsened.

A seamless steel pipe according to the present embodiment was completed on the basis of the findings described above. The details of the seamless steel pipe according to the present embodiment will be described in the following.

[Chemical Composition]

The chemical composition of the seamless steel pipe according to the present embodiment contains the following elements.

C: 0.03 to 0.080

Carbon (C) increases the strength of steel. However, when a C content is excessively high, the toughness of the steel is decreased. Hence, the C content is 0.03 to 0.08%.

Si: Not More than 0.25%

Silicon (Si) not only is added for the purpose of deoxidizing the steel but also contributes to increasing strength and increasing resistance to softening when tempering. However, when a Si content is excessively high, the toughness of the steel is decreased. Hence, the Si content is not more than 0.25%. A preferable lower limit of the Si content is 0.05%.

Mn: 0.3 to 2.0%

Manganese (Mn) increases the hardenability of the steel. For that reason, Mn can increase the strength of the central portion of the wall thickness. However, when a Mn content is excessively high, the toughness of the steel is decreased. Hence, the Mn content is 0.3 to 2.0%. A preferable lower limit of the Mn content is more than 0.3%, more preferably 0.5%, and still more preferably 1.0%.

P: Not More than 0.05%

Phosphate (P) is an impurity. P decreases the toughness of the steel. Hence, it is preferable that a P content be lower. The P content is not more than 0.05%. A preferable P content is not more than 0.02%, and more preferably not more than 0.01%.

S: Not More than 0.005%

Sulfur (S) is an impurity. S decreases the toughness of the steel. Hence, it is preferable that a S content be lower. The S content is not more than 0.005%. A preferable S content is not more than 0.003%, and more preferably not more than 0.001%.

Al: 0.001 to 0.10%

An aluminum (Al) content in the present invention means a content of acid-soluble Al (so-called Sol. Al). Al deoxidizes the steel. However, when an Al content is excessively high, a cluster-like inclusion is formed to thereby decrease the toughness of the steel. Hence, the Al content is 0.001 to 0.10%. A preferable lower limit of the Al content is higher than 0.001%, and more preferably 0.01%. A preferable upper limit of the Al content is less than 0.10%, and more preferably 0.07%.

Cr: 0.02 to 1.0%

Chrome (Cr) increases the hardenability of the steel and increases the strength of the steel. However, when a Cr content is excessively high, the toughness of the steel is decreased. Hence, the Cr content is 0.02 to 1.0%. A preferable lower limit of the Cr content is higher than 0.02%, and more preferably 0.1%. A preferable upper limit of the Cr content is less than 1.0%, and more preferably 0.8%.

Ni: 0.02 to 1.0%

Nickel (Ni) increases the hardenability of the steel and increases the strength of the steel. However, when a Ni content is excessively high, the effect of Ni is saturated. Hence, the Ni content is 0.02 to 1.0%. A preferable lower limit of the Ni content is higher than 0.02%, and more preferably 0.1%.

Mo: 0.02 to 0.8%

Molybdenum (Mo) increases the hardenability of the steel and increases the strength of the steel. However, when a Mo content is excessively high, the toughness of the steel is decreased. Hence, the Mo content is 0.02 to 0.8%. A preferable lower limit of the Mo content is higher than 0.02%, and more preferably 0.1%. A preferable upper limit of the Mo content is less than 0.8%, and more preferably 0.5%.

N: 0.002 to 0.008%

Nitrogen (N) combines with Al, Ti or the like to thereby form nitride. When a large amount of N is contained, the nitride is coarsened to thereby produce an adverse effect on the toughness. On the other hand, when a N content is excessively small, the amount of the nitride becomes too small, which makes it hard to produce an effect of inhibiting austenite grains from being coarsened at the time of hot rolling. Hence, the N content is 0.002 to 0.008%. A preferable lower limit of the N content is higher than 0.002%, and more preferably 0.004%. A preferable upper limit of the N content is less than 0.008%, and more preferably 0.007%.

Ca: 0.0005 to 0.005%

Calcium (Ca) deoxidizes the steel. Further, Ca combines with S in the steel to form CaS. The production of CaS inhibits the production of MnS. In other words, Ca inhibits the production of the MnS to thereby enhance the toughness and the hydrogen induced cracking (HIC) resistance of the steel. However, when a Ca content is excessively high, a cluster-like inclusion is formed and hence the toughness and the HIC resistance are decreased.

Nb: 0.01 to 0.1%

Niobium (Nb) combines with C and N in the steel to thereby form a fine Nb carbonitride, thereby increasing the strength of the steel. Further, the fine Nb carbonitride increases the strength of the steel by dispersion strengthening. However, when a Nb content is excessively high, the Nb carbonitride is coarsened to thereby decrease the toughness of the steel. Hence, the Nb content is 0.01 to 0.1%. A preferable upper limit of the Nb content is less than 0.1%, and more preferably less than 0.08%.

The balance of the seamless steel pipe according to the present embodiment is iron (Fe) and impurities. The impurities described here mean elements mixed from ores and scraps used as the raw materials of the steel or from the environment or the like in the producing process.

The seamless steel pipe according to the present embodiment may further contain Ti in place of a part of Fe. Ti is not an essential element but a selective element.

Ti: Not More than 0.010%

Titanium (Ti) combines with N in the steel to form TiN, thereby inhibiting a decrease in the toughness of the steel caused by dissolved N. Further, fine TiN is dispersed and precipitated to thereby produce an effect of inhibiting the austenite grains from being coarsened at the time of a hot rolling process, thereby further enhancing the toughness of the steel. When the steel contains even a small amount of Ti, the effect can be produced. However, when a Ti content is excessively high, TiN is coarsened and coarse TiC is formed, which hence decreases the toughness of the steel. In other words, in order to finely disperse TiN, the Ti content is limited. Hence, the Ti content is not more than 0.010%. A preferable lower limit of the Ti content is 0.001%, and more preferably 0.004%.

The seamless steel pipe according to the present embodiment may further contain at least one selected from a group consisting of V and Cu in place of a part of Fe. V and Cu are not essential elements but selective elements. Both of these elements increase the strength of the steel.

V: Not More than 0.1%

Vanadium (V) combines with C and N in the steel to form a fine carbonitride, thereby increasing the strength of the steel. When the steel contains even a small amount of V, the effect described above can be produced. However, when a V content is excessively high, a V carbonitride is coarsened to thereby decrease the toughness of the steel. Hence, the V content is not more than 0.1%. A preferable lower limit of the V content is 0.01%. A preferable upper limit of the V content is less than 0.1%, and more preferably 0.08%.

Cu: Not More than 1.0%

Copper (Cu) increases the hardenability of the steel and increases the strength of the steel. However, when a Cu content is excessively high, the toughness of the steel is decreased. Hence, the Cu content is not more than 1.0%. A preferable lower limit of the Cu content is 0.1%. A preferable upper limit of the Cu content is less than 1.0%, and more preferably 0.6%.

[Wall Thickness]

The wall thickness of the seamless steel pipe according to the present embodiment is not less than 50 mm. In other words, the seamless steel pipe according to the present embodiment is a thick-walled steel pipe. An upper limit of a wall thickness is preferably 80 mm, and more preferably 70 mm.

[Prior Austenite Grain Size (Prior γ Grain)]

In the thick-walled steel pipe having the wall thickness described above, generally, a crystal grain size is easily varied in the near surface portion and in the central portion of the wall thickness of the steel pipe. However, in the seamless steel pipe according to the present embodiment, the average crystal grain size of the prior γ grains in the near surface portion is less than 80 μm and a difference in the average size of the prior γ grains between in the near surface portion and in the central portion of the wall thickness is less than 50 μm. For that reason, the seamless steel pipe according to the present embodiment has excellent toughness and can inhibit variations in the toughness between in the near surface portion and in the central portion of the wall thickness.

Here, the average crystal grain size of the prior γ grains in the near surface portion can be obtained by the following method. In a measuring area (500 μm×500 μm) centered at a position of a depth of 2 mm from the surface (outer surface or inner surface) of a cross section (section perpendicular to an axial direction of the seamless steel pipe) of the seamless steel pipe are measured the prior γ grain sizes (average crystal grain size of the prior γ grains). Prior γ grain boundaries are developed by the use of a picric acid saturated aqueous solution. The measurement of the average crystal grain size of the prior γ grains in the measuring area is made on the basis of a method shown by JIS G0551 (2005) and a grain size number is converted into an average crystal grain size and the average crystal grain size is evaluated. This average crystal grain size is defined as an average crystal grain size of the prior γ grains of the near surface portion.

Similarly, a measuring area (500 μm×500 μm) centered at a center position of the wall thickness in the cross section described above is selected, and an average crystal grain size of the prior γ grains in the measuring area is calculated by the same method described above. This average crystal grain size is defined as an average crystal grain size of the prior γ grains of the central portion of the wall thickness.

In the seamless steel pipe according to the present embodiment, the prior γ grains of the near surface portion are inhibited from being coarsened. For that reason, the seamless steel pipe can show excellent toughness. Further, the seamless steel pipe can suppress the hardness of the near surface portion and hence can have also an excellent sour resistance. Still further, a difference in the average crystal grain size of the prior γ grains between in the near surface portion and in the central portion of the wall thickness is small. For that reason, variations in the toughness can be reduced in the near surface portion and in the central portion of the wall thickness of the seamless steel pipe. In this regard, the average crystal grain size is smaller in the central portion of the wall thickness than in the near surface portion.

[Production Method]

An example of a method for producing a seamless steel pipe described above will be described. The seamless steel pipe described above may be produced by the other production method.

[Equipment System]

Figure 2:
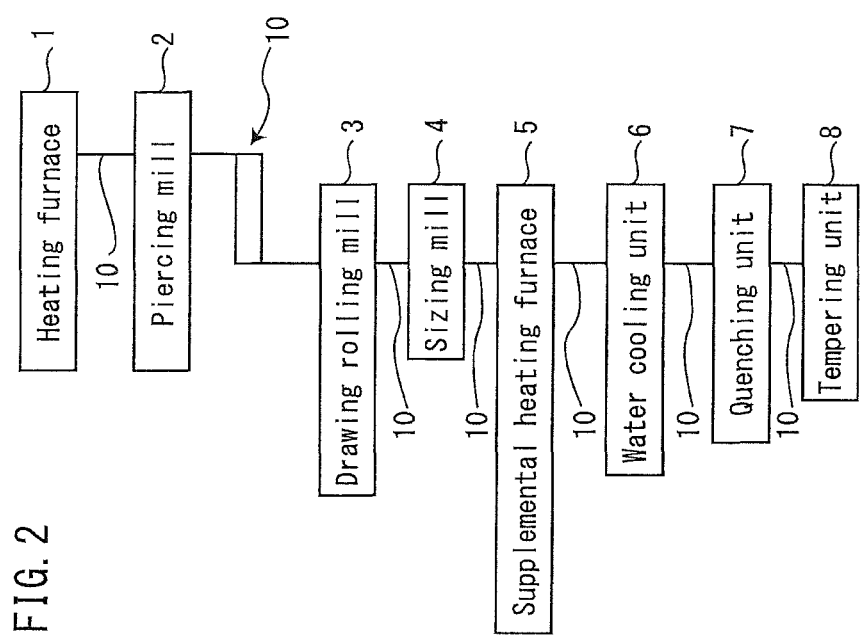
FIG. 2 is a layout diagram showing one example of a production equipment of a seamless steel pipe according to the present embodiment.

FIG. 2 is a block diagram showing an example of a production line of a seamless steel pipe for a line pipe according to the present embodiment. Referring to FIG. 2, the production line includes a heating furnace 1, a piercing machine 2, a drawing-rolling mill 3, a sizing mill 4, a supplemental heating furnace 5, a water cooling unit 6, a quenching unit 7, and a tempering unit 8. A plurality of transfer rollers 10 are arranged between the respective units. In FIG. 2, the quenching unit 7 and the tempering unit 8 are also included by the production line. However, the quenching unit 7 and the tempering unit 8 may be arranged separately from the production line. In short, the quenching unit 7 and the tempering unit 8 may be arranged off line.

[Production Flow]

Figure 3:
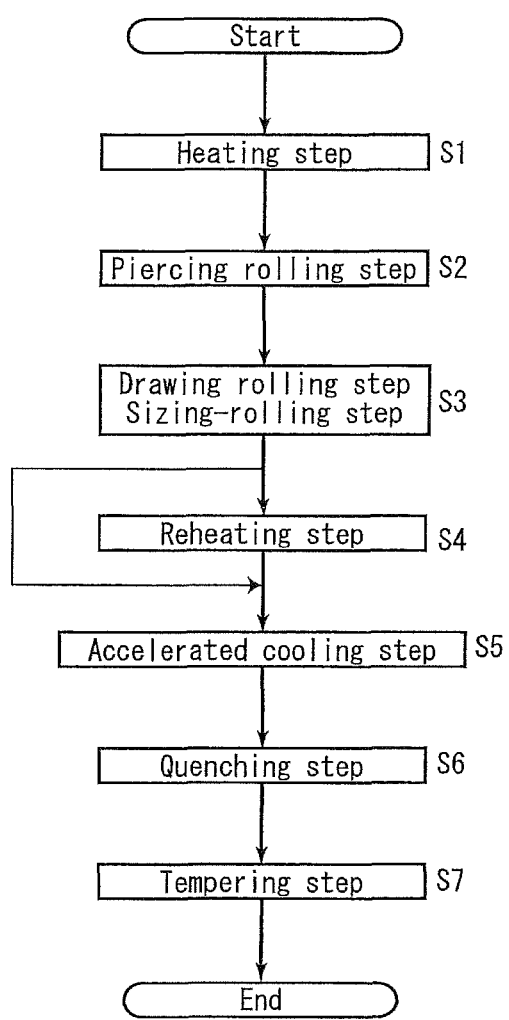
FIG. 3 is a flow diagram showing one example of a method for producing a seamless steel pipe according to the present embodiment.

FIG. 3 is a flow diagram showing a production process of the seamless steel pipe according to the present embodiment.

Referring to FIG. 3, in the method for producing a seamless steel pipe according to the present embodiment, first, a starting material is heated in the heating furnace 1 (S1). The starting material is, for example, a round billet. The starting material may be produced by a continuous casting machine such as a round CC. Further, the starting material may be produced by forging or billeting an ingot or a slab. In the present example, assuming that the starting material is a round billet, the description of the method will be continuously made. The heated round billet is hot-worked, thereby being made into a material pipe (S2 and S3). The produced material pipe is heated to a specified temperature by the supplemental heating furnace 5 as required (S4). Then, the material pipe is water-cooled by the water cooling unit 6 (accelerated cooling: S5). The water-cooled material pipe is quenched by the quenching unit 7 (S6) and then is tempered by the tempering unit 8 (S7). The seamless steel pipe according to the present embodiment is produced by the process described above. Hereinafter, the respective steps of the process will be described in detail.

[Heating Step (S1)]

Firstly, the round billet is heated by the heating furnace 1. A preferable heating temperature is 1150 to 1280° C. When the heating temperature is not less than 1150° C., the starting material is small in a deformation resistance in the hot working and hence is hard to cause a flaw. When the heating temperature is not more than 1280° C., a scale loss can be reduced and also a fuel consumption is reduced. A preferable upper limit of the heating temperature is 1200° C. The heating furnace 1 is, for example, a walking beam furnace or a rotary furnace which is well-known.

[Piercing Step (S2)]

The round billet is extracted from the heating furnace. Then, the heated round billet is piercing-rolled by the piercing machine 2. The piercing machine 2 has a pair of skew rolls and a plug. The plug is arranged between the skew rolls. A preferable type of the piercing machine 2 is a crossing type piercing machine. This is because the crossing type piercing machine can pierce the round billet at a high pipe expanding rate.

[Rolling Step (S3)]

Next, the material pipe is rolled. Specifically, the material pipe is drawn and rolled by the drawing-rolling mill 3. The drawing-rolling mill 3 includes a plurality of roll stands arranged in series. The drawing-rolling mill 3 is, for example, a mandrel mill. Subsequently, the material pipe drawn and rolled is sizing-rolled by the sizing mill 4 to produce a seamless steel pipe. The sizing mill 4 includes a plurality of roll stands arranged in series. The sizing mill 4 is, for example, a sizer or a stretch reducer.

A surface temperature of the material pipe rolled by a roll stand arranged at a tail end of the plurality of roll stands of the sizing mill 4 is defined as a "finishing temperature". The finishing temperature is measured, for example, by a temperature sensor arranged on the exit side of the roll stand arranged at a tail end of the sizing mill 4. A preferable finishing temperature is 900° C. to 1100° C. In order to acquire the preferable finishing temperature, a soaking furnace may be arranged between the drawing-rolling mill 3 and the sizing mill 4 and the material pipe drawn and rolled by the drawing-rolling mill 3 may be soaked.

[Reheating Step (S4)]

A reheating step (S4) is performed as required. In the case where the reheating step is not performed, in FIG. 2, the process proceeds from the step S3 to the step S5. Further, in the case where the reheating step is not performed, in FIG. 3, the supplemental heating furnace 5 is not arranged. The supplemental heating furnace means a reheating furnace for holding a produced seamless steel pipe at a quenching temperature without cooling the seamless steel pipe.

The produced seamless steel pipe is inserted into the supplemental heating furnace 5 and is heated. This processing can make the distribution of the prior γ grains more uniform. A preferable heating temperature in the supplemental heating furnace 5 is 900° C. to 1100° C. A preferable soaking time is not more than 30 minutes. This is because when the soaking time is too long, the prior γ grains might be coarsened.

[Accelerated Cooling Step (S5)]

The material pipe produced in the step S3 or the material pipe reheated in the step S4 is cooled in an accelerated manner. Specifically, the material pipe is water-cooled by the water cooling unit 6. The temperature (surface temperature) of the material pipe just before water cooling is not less than an $A_{r3}$ point, and preferably not less than 900° C. In the case where the temperature of the material pipe which is not yet cooled in the accelerated manner is less than the $A_{r3}$ point, the material pipe is reheated by the use of the supplemental heating furnace 5, an induction heating unit, or the like to thereby make the temperature of the material pipe not less than the $A_{r3}$ point.

A preferable cooling rate of the material pipe when the material pipe is cooled in the accelerated manner is not less than 100° C./min and a preferable cooling stop temperature is not more than the $A_{r1}$ point. A more preferable water cooling stop temperature is not more than 450° C.

In the case where the material pipe is not cooled in the accelerated manner but is naturally cooled after rolling, a low cooling rate results in a microstructure comprising mainly coarse and inhomogeneous ferrite pearlite. In this case, the material pipe has little nucleation sites of the reversely transformed γ grains. On the other hand, when the material pipe is cooled in the accelerated manner as described above, the material pipe has a parent phase structure martensitized or bainitized and hence densified, thereby having many nucleation sites of the reversely transformed γ grains.

The water cooling unit 6 is constructed, for example, in the following manner. The water cooling unit 6 includes a plurality of rotary rollers, a laminar water flow section, and a jet water flow section. The plurality of rotary rollers are arranged in two rows. The material pipe is arranged between the plurality of rotary rollers arranged in the two rows. At this time, the rotary rollers arranged in the two rows are put into contact with the lower portion of the outer surface of the material pipe. When the rotary rollers are rotated, the material pipe is rotated around an axis thereof. The laminar water flow section is arranged over the rotary rollers and pours water to the material pipe from above. At this time, the water poured to the material pipe forms a laminar water flow. The jet water flow section is arranged near the end of the material pipe arranged on the rotary rollers. The jet water flow section jets a jet water flow to the inside of the material pipe from the end of the material pipe. The outer surface and the inner surface of the material pipe are cooled at the same time by the laminar water flow section and the jet water flow section. The construction of the water cooling unit 6 of this type is particularly suitable for cooling, in the accelerated manner, the thick-walled seamless steel pipe of the present embodiment, which has a wall thickness not less than 50 mm.

The water cooling unit 6 may be other unit other than the rotary rollers, the laminar water flow section, and the jet water flow section. The water cooling unit 6 may be, for example, a water tank. In this case, the material pipe produced in the step S3 is dipped in the water tank, thereby being cooled. The water cooling unit 6 may include only the laminar water flow section. In short, the type of the water cooling unit 6 is not limited to a specific type.

[Quenching Step (S6)]

The material pipe water-cooled by the water cooling unit 6 is reheated and is quenched (S6). Firstly, the seamless steel pipe is heated by the quenching unit 7 (reheating step). A reheating temperature at this time is made to 990 to 1100° C. As described above, in the case where the reheating temperature is less than 990° C., NbC inhibits the growth of the granular reversely transformed γ grains, which are effective for fining the prior γ grains, by a pinning effect. For that reason, it is hard for the prior γ grains of a product to be fined and the prior γ grains in the near surface portion, in particular, are coarsened. On the other hand, in the case where the reheating temperature is higher than 1100° C., the prior γ grains of the product are coarsened in both of the near surface portion and the central portion of the wall thickness.

When the reheating temperature is 990 to 1100° C., NbC is melted and Nb and C are dissolved. For that reason, at the time of reheating, the granular reversely transformed γ grains are easy to grow, whereby the prior γ grains of the product are inhibited from being coarsened. In this way, the average crystal grain size of the prior γ grains of the near surface portion, in particular, is made less than 80 μm, which hence increases the toughness. Further, a difference in the average crystal grain size of the prior γ grains between in the near surface portion and in the central portion of the wall thickness is made less than 50 μm, which hence inhibits variations in the toughness of the steel.

The heated material pipe is quenched by cooling (cooling step). For example, the heated material pipe is quenched by water cooling. Preferably, the temperature of the material pipe is cooled to a room temperature. In this way, a parent phase structure is martensitized or bainitized, thereby being densified.

[Tempering Step (S7)]

The quenched material pipe is tempered. A tempering temperature is not more than the $A_{c1}$ point, preferably 550 to 700° C. A preferable retention time (soaking time) at the tempering temperature is 10 to 120 minutes. By a tempering processing, the strength grade of the seamless steel pipe can be made not less than an X 80 class based on the API standards, in other words, the yield stress of the seamless steel pipe can be made not less than 551 MPa.

In this regard, in the tempering step, fine NbC is again precipitated and hence the strength of the steel is increased.

The seamless steel pipe produced in the production process described above contains Nb and hence acquires high strength. Further, even if the wall thickness is not less than 50 mm, the average crystal grain size of the prior γ grains in the near surface portion is less than 80 μm and the difference in the average size of the prior γ grains between in the near surface portion and in the central portion of the wall thickness becomes less than 50 μm. For that reason, the seamless steel pipe has excellent toughness in both of the near surface portion and the central portion of the wall thickness and has a small variation in the toughness.

Example 1

[Examination Method]

[Production of Test Material]

A plurality of steels having a chemical composition shown in Table 1 were melted in a vacuum melting furnace and an ingot of 180 kg was produced for each steel number.

TABLE 1

| Steel number | Chemical composition (unit: mass %, balance being Fe and impurities) | | | | | | | | | | | | | | |
|---|---|---|---|---|---|---|---|---|---|---|---|---|---|---|---|
| | C | Si | Mn | P | S | Cu | Cr | Ni | Mo | V | Ti | Nb | Ca | sol-Al | N |
| A | 0.059 | 0.14 | 1.45 | 0.012 | 0.001 | 0.36 | 0.30 | 0.43 | 0.20 | 0.051 | 0.006 | — | 0.0019 | 0.028 | 0.0040 |
| B | 0.057 | 0.15 | 1.46 | 0.010 | 0.001 | 0.26 | 0.40 | 0.25 | 0.35 | 0.004 | 0.050 | — | 0.0021 | 0.030 | 0.0045 |
| C | 0.058 | 0.15 | 1.46 | 0.010 | 0.001 | 0.26 | 0.40 | 0.25 | 0.35 | 0.003 | — | 0.05 | 0.0021 | 0.029 | 0.0046 |
| D | 0.060 | 0.15 | 1.60 | 0.011 | 0.001 | — | 0.44 | 0.10 | 0.35 | — | — | 0.03 | 0.0018 | 0.031 | 0.0047 |

The produced ingots were inserted into the heating furnace and were soaked at 1250° C. for 1 hour. The ingots extracted from the heating furnace were hot-forged to produce rectangular parallelepiped blocks. The blocks were inserted into the heating furnace and were soaked at 1250° C. for 30 minutes. Hot rolling was performed to the soaked blocks to produce thick plates each having a thickness of 53 mm or 60 mm. All of the finishing temperatures at the hot rolling for the respective blocks were 1050° C. The produced thick plates were held at 950° C. for 5 minutes. Then, water quenching (accelerated cooling) was performed to the thick plates.

After the water quenching, the test materials of test numbers of 1 to 17 were reheated at reheating temperatures (° C.) shown in Table 2. At this time, all test materials were heated at a temperature raising rate of 5° C./min. A soaking time was 5 minutes for all test materials. After soaking, water quenching was performed to the test materials. Tempering at 650° C. for 30 minutes was performed to the quenched test materials. In this way, the test materials were acquired.

TABLE 2

| Test number | Steel number | Plate thickness (mm) | Reheating temperature (° C.) | Central portion of wall thick | | | Near surface portion | | | Grain size difference (μm) | Note |
|---|---|---|---|---|---|---|---|---|---|---|---|
| | | | | Yield strength (MPa) | Absorbed energy (J) | Average crystal grain size (μm) | Vickers hardness (HV) | Absorbed energy (J) | Average crystal grain size (μm) | | |
| 1 | A | 53 | 950 | 496 | 271 | 31 | 221 | 162 | 37 | 6 | Comparative example |
| 2 | A | 53 | 1000 | 530 | 269 | 36 | 236 | 100 | 33 | 2 | Comparative example |
| 3 | A | 53 | 1050 | 542 | 245 | 40 | 214 | 194 | 38 | 2 | Comparative example |
| 4 | B | 53 | 950 | 565 | 13 | 18 | 270 | 10 | 58 | 40 | Comparative example |
| 5 | B | 53 | 1000 | 597 | 7 | 26 | 285 | 9 | 45 | 18 | Comparative example |
| 6 | B | 53 | 1050 | 638 | 3 | 37 | 264 | 5 | 55 | 18 | Comparative example |
| 7 | C | 53 | 950 | 550 | 225 | 20 | 257 | 13 | 100 | 79 | Comparative example |
| 8 | C | 53 | 970 | 552 | 220 | 21 | 260 | 9 | 95 | 74 | Comparative example |
| 9 | C | 53 | 1000 | 554 | 176 | 22 | 240 | 105 | 70 | 47 | Present invention |
| 10 | C | 53 | 1050 | 575 | 175 | 28 | 232 | 115 | 51 | 23 | Present invention |
| 11 | C | 60 | 950 | 546 | 231 | 23 | 250 | 23 | 105 | 82 | Comparative example |
| 12 | C | 60 | 1000 | 560 | 230 | 25 | 235 | 133 | 65 | 40 | Present invention |
| 13 | C | 60 | 1050 | 574 | 191 | 30 | 230 | 109 | 51 | 21 | Present invention |
| 14 | C | 53 | 1150 | 580 | 50 | 90 | 265 | 20 | 105 | 15 | Comparative example |
| 15 | D | 53 | 980 | 556 | 220 | 26 | 243 | 102 | 78 | 52 | Comparative example |
| 16 | D | 53 | 1050 | 560 | 211 | 31 | 238 | 115 | 60 | 29 | Present invention |
| 17 | D | 53 | 1150 | 580 | 40 | 95 | 255 | 30 | 95 | 0 | Comparative example |

[Evaluation Test]
[Measurement Test of Average Crystal Grain Size of Prior γ Grains]

For each of the test materials (thick plates) of the test numbers 1 to 17, an average crystal grain size (μm) of the prior γ grains of a near surface portion (an area of 500 μm×500 μm centered at a position of a depth of 2 mm from a surface (an upper surface or a lower surface) in a section in a thickness direction of the thick plate) and an average crystal grain size (μm) of the prior γ grains of a central portion of a wall thickness (an area of 500 μm×500 μm centered at a center position in a thickness direction in the section in the thickness direction of the thick plate) were obtained on the basis of the measurement and calculation methods described above. Since the test materials of the prior γ grain size were the thick plates, the center position of the plate thickness (in other words, in the case of the plate having a thickness of 53 mm, a position of 26.5 mm from the surface, whereas in the case of the plate having a thickness of 60 mm, a position of 30 mm from the surface) was considered to be the center of the central portion of the wall thickness and an average crystal grain size of the prior γ grains of the central portion of the wall thickness was acquired. According to the measurement method described above, the prior γ grain boundaries were developed by the use of the picric acid saturated aqueous solution, and an average crystal grain size of the prior γ grains was obtained by converting a grain size number into a grain size on the basis of a method shown by JIS G0551.

[Tension Test]

A 14A tension test specimen (D=8.5 mmφ) in compliance with JIS Z2201 (1998) was acquired from the central portion of the plate thickness of each test material. A tension test in compliance with JIS Z2241 (1998) was performed at a normal temperature (25° C.) in the atmosphere by the use of the acquired test specimen, whereby a yield strength (0.2% proof stress) was obtained.

[Toughness Evaluation Test]

A V-notch test specimen based on No. 4 test coupon of JIS Z2242 was acquired from the near surface portion and the central portion of the wall thickness (center portion of the plate thickness) of each test material of the test numbers 1 to 17 in such a way to be parallel to a cross sectional direction of the test material. Each of the V-notch test specimens of the near surface portion included the surface and had a cross section of 10 mm×10 mm and had a V notch having a depth of 2 mm. Each of the V-notch test specimens of the central portion of the wall thickness had a center in the plate thickness located at the center of a cross section (10 mm×10 mm) and had a V notch having a depth of 2 mm.

A Charpy impact test in compliance with JIS Z2242 was performed by the use of the acquired V-notch test specimens at −40° C., whereby an absorbed energy at −40° C. was obtained for each of the V-notch test specimens.

[Hardness Test of Near Surface Portion]

In each of the test materials of the test numbers 1 to 17, a Vickers hardness of the near surface portion was measured by the following method. Three arbitrary measurement points were selected from a position of a depth of 2 mm from the surface of each of the test materials. In each of the measurement points, a Vickers hardness test in compliance with JIS Z2244 (2009) was performed. At this time, a test force was 10 kgf. An average of Vickers hardnesses obtained at the three measurement points was defined as the hardness (HV) of the near surface portion of the test material.

[Test Result]

Test results are shown in Table 2. Referring to Table 2, all of the test materials of the test numbers 9, 10, 12, 13, and 16 had suitable chemical compositions. For that reason, the yield strength was as high as not less than 551 MPa. Further, the reheating temperature was suitable and hence the average crystal grain size of the prior γ grains in the near surface portion was less than 80 μm. For that reason, the Vickers hardness of the near surface portion was as low as less than 245 HV.

Further, although the plate thickness is as large as 53 mm and 60 mm, a difference in the average crystal grain size between in the near surface portion and in the central portion of the wall thickness (hereinafter referred to as "grain size difference") was less than 50 μm and the absorbed energies of both of the central portion of the wall thickness and the near surface portion were not less than 100 J. Still further, a difference in the absorbed energy between in the central portion of the wall thickness and in the near surface portion was as small as less than 100 J and a variation in the toughness was small.

On the other hand, in the chemical composition of the test materials of a steel number A used for the test numbers 1 to 3, Nb was not contained. For that reason, the yield strengths of the test materials of the test numbers 1 to 3 were lower than the yield strengths of the test materials of the test numbers 9, 10, 12, 13, and 16.

In the chemical composition of the test materials of a steel number B used for the test numbers 4 to 6, a Ti content was high. For that reason, the absorbed energies at −40° C. in the central portion of the wall thickness and in the near surface portion were low.

In the test materials of the test numbers 7, 8 and 11, the reheating temperature was low. For that reason, the average crystal grain size of the prior γ grains of the near surface portion was as large as not less than 80 μm. For that reason, the Vickers hardness of the near surface portion was high and the absorbed energy at −40° C. of the near surface portion was low. Further, the grain size difference was as large as not less than 50 μm, so that a difference in the absorbed energy between in the central portion of the wall thickness and in the near surface portion was as large as not less than 100 J and a variation in the toughness was large.

In the test material of the test number 15, the reheating temperature was low. For that reason, a grain size difference between in the near surface portion and in the central portion of the wall thickness was as large as not less than 50 μm. For that reason, a difference in the absorbed energy at −40° C. between in the near surface portion and in the central portion of the wall thickness was as large as not less than 100 J and a variation in the toughness was large.

In the test materials of the test numbers 14 and 17, the reheating temperature was high. For that reason, average crystal grain sizes of the prior γ grains of the central portion of the wall thickness and the near surface portion were as large as not less than 80 μm. For that reason, the absorbed energies at −40° C. of the central portion of the wall thickness and the near surface portion were low. Further, the Vickers hardness of the near surface portion was high.

Example 2

[Production of Test Material]

Steel having a chemical composition shown in Table 3 was melted in a converter and then a plurality of round billets were produced by a continuous casting process.

The chemical composition shown in Table 3 was appropriate. The round billets were heated to 1250° C. by the heating furnace. Subsequently, the round billets were piercing-rolled by a piercing rolling mill to produce material pipes. Subsequently, the material pipes were drawn and rolled by a mandrel mill. Then, the material pipes were sizing-rolled by a sizer to produce material pipes having a wall thickness of 53 mm.

Just after sizing-rolling, the material pipes were not cooled to the room temperature but were soaked to 950° C. by a supplemental heating furnace. Then, the material pipes were quenched by water. The quenched material pipes were reheated. A reheating temperature at that time was 1050° C. After reheating, the material pipes were again quenched by water. The quenched material pipes were tempered at 600° C. for 30 minutes to produce seamless steel pipes.

[Evaluation Test]

As is the case with Example 1, each of the test specimens was subjected to the measurement test of average crystal grain size of the prior γ grains, the tension test, the toughness evaluation test, and the hardness test of the near surface portion. In this regard, as for the near surface portion, in the near surface portion on the inner surface side and in the near surface portion on the outer surface side of the seamless steel pipe were respectively obtained a Vickers hardness, an absorbed energy and an average crystal grain size.

[Test Result]

A test result is shown in Table 4.

TABLE 4

| Test number | Plate thickness (mm) | Reheating temperature (° C.) | Central portion of wall thickness | | | Near surface portion (inner surface side) | | | | Near surface portion (outer surface side) | | | |
|---|---|---|---|---|---|---|---|---|---|---|---|---|---|
| | | | Yield strength (MPa) | Absorbed energy (J) | Average crystal grain size (μm) | Vickers hardness (HV) | Absorbed energy (J) | Average crystal grain size (μm) | Grain size difference (μm) | Vickers hardness (HV) | Absorbed energy (J) | Average crystal grain size (μm) | Grain size difference (μm) |
| 18 | 53 | 1050 | 560 | 210 | 28 | 235 | 153 | 60 | 32 | 220 | 160 | 51 | 23 |

Referring to Table 4, the chemical composition of the test number 18 was appropriate. For that reason, the yield strength was as high as not less than 551 MPa. Further, the reheating temperature was suitable and hence an average crystal grain size of the prior γ grains of the near surface portions (on the inner surface side and on the outer surface side) was less than 80 μm. For that reason, the Vickers hardness of the near surface portion was as low as less than 245 HV. Still further, an absorbed energy at −40° C. was as high as not less than 100 J.

Further, although the wall thickness was as large as 53 mm, a grain size difference between in the near surface portion and in the central portion of the wall thickness was less than 50 μm, and a difference in the absorbed energy between in the central portion of the wall thickness and in the near surface portion was as small as less than 100 J.

Although the embodiments of the present invention have been described above, the embodiments described above are

TABLE 3

| Test number | Chemical composition (unit: mass %, balance being Fe and impurities) | | | | | | | | | | | | | | |
|---|---|---|---|---|---|---|---|---|---|---|---|---|---|---|---|
| | C | Si | Mn | P | S | (Cu) | Cr | Ni | Mo | (V) | (Ti) | Nb | Ca | sol-Al | N |
| 18 | 0.06 | 0.15 | 1.53 | 0.0013 | 0.001 | 0.3 | 0.28 | 0.31 | 0.3 | 0.05 | 0.008 | 0.03 | 0.002 | 0.038 | 0.004 | only examples for carrying out the present invention. Hence, the present invention is not limited to the embodiments described above but can be put into practice by modifying the embodiments described above as required within a scope not departing from the gist of the present invention.

INDUSTRIAL APPLICABILITY

The seamless steel pipe according to the present invention can be used, for example, as a line pipe and, in particular, is suitable for an undersea line pipe (flow line and riser).

The invention claimed is:

1. A seamless steel pipe consisting of: in mass %,
C: 0.03 to 0.08%,
S: not more than 0.25%,
Mn: 0.3 to 2.0%,
P: not more than 0.05%,
S: not more than 0.005%,
Al: 0.001 to 0.10%,
Cr: 0.02 to 1.0%,
Ni: 0.02 to 1.0%,
Mo: 0.02 to 0.8%,
N: 0.002 to 0.008%,
Ca: 0.0005 to 0.005%,
Nb: 0.03 to 0.1%, and
optionally one or more selected from the group consisting of Ti: not more than 0.010%, Cu: not more than 1.0%, and V: not more than 0.1%, and
the balance being Fe and impurities, and
having a wall thickness not less than 50 mm,
wherein in a cross section perpendicular to an axial direction of the seamless steel pipe, an average crystal grain size of prior austenite grains in a near surface portion is less than 80 μm, the near surface portion being a 500 μm×500 μm area centered at a position of a depth of 2 mm from a surface, and
wherein a difference between the average crystal grain size of the prior austenite grains in the near surface portion and an average crystal grain size of prior austenite grains in a central portion of a wall thickness in the cross section is less than 50 μm, the central portion being a 500 μm×500 μm area centered at a center position of the wall thickness of the seamless steel pipe; and,
the seamless steel pipe has a yield strength of not less than 551 MPa.

2. The seamless steel pipe according to claim 1, containing:
Ti: 0.001 to 0.010%.

3. The seamless steel pipe according to claim 1, containing: at least one selected from a group consisting of:
Cu: 0.1 to 1.0%, and
V: 0.01 to 0.1%.

4. The seamless steel pipe according to claim 2, containing: at least one selected from a group consisting of:
Cu: 0.1 to 1.0%, and
V: 0.01 to 0.1%.

* * * * *